United States Patent [19]

Safiuddin et al.

[11] 4,227,130

[45] Oct. 7, 1980

[54] TORQUE COMPENSATION SYSTEM

[75] Inventors: Mohammed Safiuddin, Amherst, N.Y.; Henry A. Dickerson, Bristol, Va.

[73] Assignee: Westinghouse Electric Corp., Pittsburgh, Pa.

[21] Appl. No.: 870,898

[22] Filed: Jan. 19, 1978

[51] Int. Cl.³ ............................................... H02P 7/28
[52] U.S. Cl. .................................... 318/338; 318/6; 318/327; 318/493
[58] Field of Search ............... 318/332, 338, 350, 308, 318/309, 310, 311, 312, 315, 317, 319, 327, 493, 6

[56] References Cited

U.S. PATENT DOCUMENTS

| | | | |
|---|---|---|---|
| 3,497,779 | 2/1970 | Eisele | 318/611 |
| 3,671,835 | 6/1972 | McMenamy et al. | 318/332 |
| 3,950,684 | 4/1976 | Peterson | 318/338 |
| 4,047,080 | 9/1977 | Peterson | 318/338 |
| 4,099,111 | 7/1978 | Inaba et al. | 318/332 |

*Primary Examiner*—David Smith, Jr.
*Assistant Examiner*—Michael K. Mutter
*Attorney, Agent, or Firm*—E. F. Possessky

[57] ABSTRACT

A torque compensation system is disclosed for d.c. motor drives using field weakening for speed control. A diode switching matrix and a static divider are connected so that the divider receives signals which are functions of motor armature current and speed respectively, and delivers at its output a signal which is proportional to motor torque for adjusting the speed reference to the motor.

5 Claims, 2 Drawing Figures

TORQUE COMPENSATION SYSTEM

BACKGROUND OF THE INVENTION

1. Field of the Invention

This invention relates to a torque compensation circuit for d.c. motor drives utilizing motor field weakening for speed control.

2. Description of the Prior Art

In industrial applications wherein two speed regulated drives are connected together by means of the material being processed, such as a metallic strip, metallic wire, synthetic fibre tow or the like, tension in the material must be controlled to prevent excessive sag or stretch beyond the elastic limit of the material. In multistand mills or strip reduction mills, speed regulated stands are used with interstand tension control apparatus to insure constant tension. In some installations it is not feasible or economically justifiable to employ elaborate interstand tension control, and a current droop is added to the speed regulated drives. Thus the speed vs. current characteristic for each motor has a drop such that under equilibrium conditions, i.e. constant speed for each motor, they run at different armature currents. Since armature current is a good indication of motor torque for motors with fixed excitation, a current droop implies torque droop and provides an acceptable interstand tension control.

However, it has been observed that the motor current signal does not represent torque for motors which have extended speed range by field weakening, and accordingly, torque must be calculated from motor current and field flux intelligence at each operating point.

SUMMARY OF THE INVENTION

In accordance with the present invention there is provided a torque compensation system for a speed regulated d.c. motor using field weakening. Dividing means, having a dividend input, for receiving an armature current signal $\bar{I}_a$, which is a function of the rated armature current, and a divisor input, for receiving a speed signal, delivers as a quotient output a torque computed signal $V_t$. Additional means determine the speed crossover point at $\bar{\omega}_m = 1$, and depending upon the motor speed, delivers an output signal to the divisor input which is equal to one for $\bar{\omega}_m \leq 1$ and to $\bar{\omega}_m$ for $\bar{\omega}_m > 1$ whereby, the computed torque signal $V_t$ is equal to $\bar{I}_a$ for all speeds $\bar{\omega}_m \leq 1$ and to $$\frac{\bar{I}_a}{\bar{\omega}_m}$$

for all speeds $\bar{\omega}_m > 1$.

DESCRIPTION OF A PREFERRED EMBODIMENT

Figure 1:
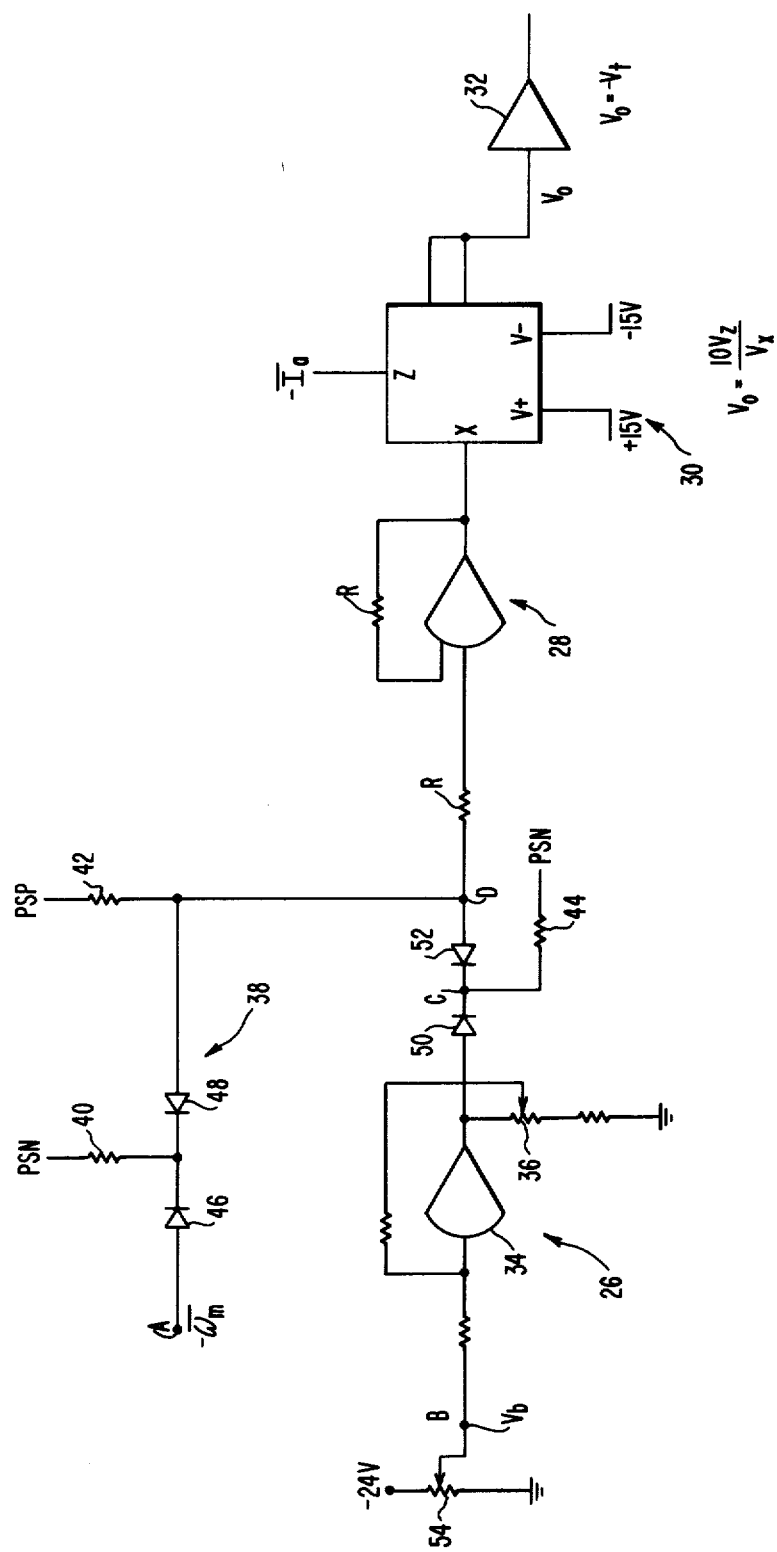
FIG. 1 is a block schematic diagram of the torque compensation system in accordance with the invention.

The torque of a d.c. motor in per unit (P.U.) form is:

$$\bar{T} = \bar{I}_a \cdot \bar{\phi}_m \tag{1}$$

where:
  $\bar{T}$ is the motor torque (P.U.)
  $\bar{I}_a$ is the motor armature current (P.U.)
  $\bar{\phi}_m$ is the motor field flux (P.U.)

Each term in equation (1) is divided by the corresponding motor rated magnitude so that it becomes dimensionless. For example, if a motor is rated at a torque of 1000 ft. lbs., and the motor is operating at a torque of 1000 ft. lbs., then $\bar{T} = 1$. If the motor is operating at 500 ft. lbs., $\bar{T} = \frac{1}{2}$ etc. For speed regulated drives using motor field weakening, the motor flux is varied in inverse proportion to the motor speed by holding the motor counter emf constant at its rated magnitude.

$$\bar{V}_m = \bar{\phi}_m \cdot \bar{\omega}_m \tag{2}$$

where:
  $\bar{V}_m$ = counter emf of the motor (P.U.)
  $\bar{\phi}_m$ = motor field flux (P.U.)
  $\bar{\omega}_m$ = speed of the motor (P.U.)

Solving for $\bar{\omega}_m$ in (2):

$$\bar{\omega}_m = \frac{\bar{V}_m}{\bar{\phi}_m} \tag{3}$$

if $\bar{V}_m = 1$ then $$\bar{\phi}_m = 1/\bar{\omega}_m \text{ for all } \bar{\omega}_m > 1 \tag{4}$$

when $\bar{\omega}_m = 0$ equation (4) becomes $\infty$ so obviously this is excluded.

For all $\bar{V}_m \leq 1$, the flux $\bar{\phi}_m$ is held constant at 1; then $$1 = \frac{\bar{V}_m}{\bar{\omega}_m} \; ; \; \bar{V}_m = \bar{\omega}_m \tag{5}$$

In summary for the entire speed range of a d.c. motor with field weakening:

$$\bar{T} = \bar{I}_a \text{ for all } \bar{\omega}_m \leq 1 \text{ (below and at base speed)} \tag{6}$$

$$\bar{T} = \frac{\bar{I}_a}{\bar{\omega}_m} \text{ for all } \bar{\omega}_m > 1 \text{ (above base speed)} \tag{7}$$

Before describing the torque compensation system of FIG. 1, reference will be made to FIG. 2 where the torque compensation system is used in the environment of wire flattening mill having a first flattening stand, an edger stand and a second flattening stand. Since the arrangement is identical at each stand, only the first stand will be considered and only those components will be described which are necessary to an understanding of the invention.

A d.c. motor 10 having a field winding indicated symbolically at 12 is controlled by speed regulator 14. A ramp generator 16 provides the mill speed reference which is adjustable to the particular motor by means of vernier speed adjustment 18 to provide the speed reference S. The torque compensation system, indicated at 20 provides a torque computed output $-V_t$ which is applied to operational amplifier 24 to modify the speed reference signal S so as to send the signal $S - K V_t$ to the speed regulator 14. A tachometer generator 22 coupled to the motor armature provides a speed signal $-\bar{\omega}_m$ which is applied to the torque compensation system 20 and the speed regulator 14. The speed regulator 14 provides the armature current signal $-\bar{I}_a$ to the torque compensation system 20. A bias voltage $V_b$ is also applied to the system 20.

Figure 2:
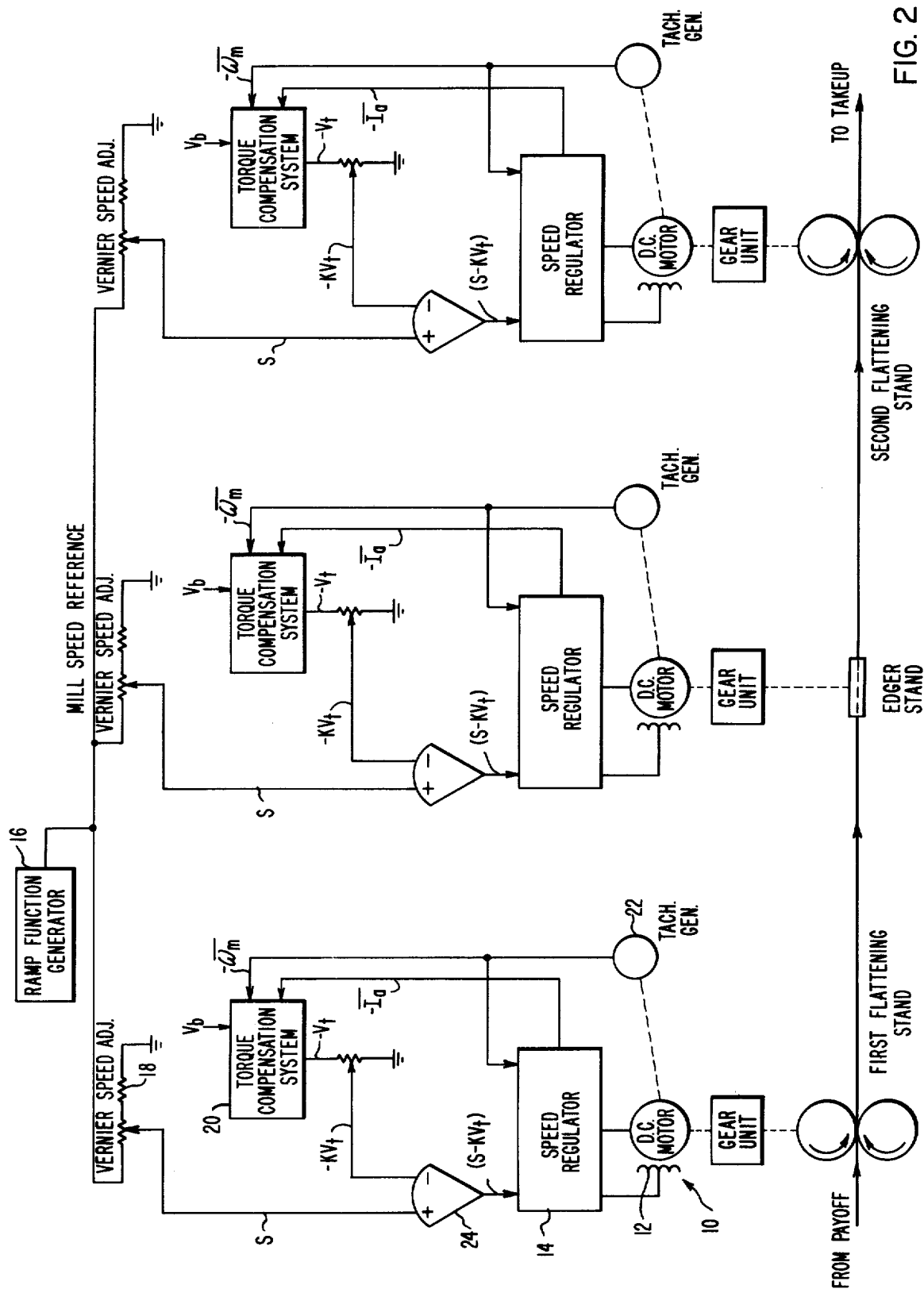
FIG. 2 is a block schematic depicting the torque compensation system of FIG. 1 used in the environment of a wire flattening mill.

The torque compensation system 20 is shown in greater detail in FIG. 1. A static linear switching circuit indicated generally at 26, determines the speed cross over point. A buffer amplifier indicated generally at 28 provides impedance isolation between the linear switching circuit 26 and a static divider indicated generally at 30. The buffer amplifier 28 is non-inverting and provides one for one signal transfer. An inverter 32 inverts the output of the static divider 30 to provide the signal $-V_t$. The linear switching circuit 26 comprises: a proportional operational amplifier 34, with a variable gain (which is achieved by means of potentiometer 36) and a resistor-diode network indicated generally at 38. The resistor-diode network comprises resistors 40, 42, 44, and diodes 46, 48, 50, and 52. The input to the operational amplifier is adjustable by means of a potentiometer 54.

The operation of the circuit may be best understood by considering a practical example. Assume that the circuit is adjusted for a drive having a speed range 4:1. The speed signal $-\bar{\omega}_m$ at node A is adjusted so that the tachometer 22 delivers an output of 10 volts at top speed. At node B, the input to the operational amplifier is:

$$V_b = \frac{10(\omega_r)}{(\omega_t)} \text{ where} \tag{8}$$

$\omega_r$ = the rated speed
$\omega_t$ = the maximum speed at weak field

Obviously with a 4:1 speed ratio the fraction $\omega_r/\omega_t = \frac{1}{4}$ so 2.5 volts are required. The potentiometer 54 is adjusted to deliver 2.5 volts at B. The armature current $\bar{I}_a = 1 =$ 'rated armature current. The static divider 30 is a standard solid state chip which has the output $V_o$.

$$V_o = 10 V_z / V_x \tag{9}$$

At below base speed diodes 50 and 52 are conducting and node D is at 2.5v.

From equation (9) $V_o$ is:

$$V_o = \frac{10(.5v.)}{2.5v}$$

$$\therefore V_o = 2 \text{ volts} \tag{11}$$

At above base speed i.e., with weakened field, at maximum speed the signal $-\bar{\omega}_m = 10$ volts.

$V_o$ then becomes:

$$V_o = \frac{10(.5v.)}{10} \tag{12}$$

$$\therefore V_o = 0.5 \text{ volts}$$

The output of the static divider 30 is a positive signal since the signals $V_z$ and $V_z$ are both negative. Since for control purposes a negative signal is required, the signal $V_o$ is inverted and becomes $-V_t$ which is proportional to the torque of the motor. The signal $-V_t$ is then $-2$ volts at rated torque, and $-0.5$ volts at top speed with the flux = 0.25.

What is claimed is:

1. A torque compensation system for a speed regulated d.c. motor using field weakening for speed control in a production mill comprising:
   (a) linear switching means having first and second inputs and an output, the first input receiving a signal $\bar{\omega}_m$ which is a function of the speed of the motor, the second input receiving a signal $\bar{\omega}_m = 1$ which is a function of the rated speed of the motor, the output of said switching means being the greater of its inputs; and
   (b) divider means having a dividend input for receiving a current signal $\bar{I}_a$ from the motor armature which is a function of the rated armature current, and a divisor input connected to the output of said linear switching means and having circuit means for generating a quotient output which is a torque compensation signal $V_t$ equal to $\bar{I}_a$ for all $\bar{\omega}_m \leq 1$ and equal to $$\frac{I_a}{\omega_m}$$

for all $\bar{\omega}_m > 1$, and
   (c) means for regulating the speed of the d.c. motor in response to a mill speed reference and in response to the signal $V_t$ so as to provide motor torque compensation for control of tension in material being operated upon in the production mill.

2. A torque compensation system according to claim 1 wherein:
   said linear switching means is a resistor-diode network comprising first, second, third and fourth diodes and first, second and third resistors, the first and second diodes being serially connected in opposed relationship, their cathodes being connected in common to a first negative voltage source through the first resistor, the anode of the first diode being connected to receive said speed signal $\bar{\omega}_m$ which has a maximum magnitude equal to the maximum weak field speed of the motor, the second and third diode being serially connected in opposed relationship, the anode of the third diode being connected to receive the signal $\bar{\omega}_m = 1$, the cathodes of the third and fourth diode being connected in common to a second negative voltage source, through the second resistor, the anodes of the second and fourth diodes being connected in common to a positive voltage source through the third resistor, the anodes of the second and fourth diodes defining the output of said linear switching means.

3. A torque compensation system according to claim 2 wherein a proportional variable gain operational amplifier has an output connected to the anode of the third diode for calibrating the speed crossover point.

4. A torque compensation system according to claim 1 wherein:
   impedance buffer means are interposed between said linear switching means and said division means.

5. A torque compensation system according to claim 1 wherein:
   means are provided for determining the speed crossover point at base speed $\bar{\omega}_m = 1$, for delivering an output to said divisor input which is equal to one for $\bar{\omega}_m \leq 1$ and to $\bar{\omega}_m$ for $\bar{\omega}_m > 1$, whereby said torque compensation signal $V_t$ is equal to $\bar{I}_a$ for all $\bar{\omega}_m \leq 1$ and $$\frac{\bar{I}_a}{\bar{\omega}_m}$$

for all $\bar{\omega}_m > 1$.

* * * * *